US005597216A

United States Patent [19]
Real et al.

[11] Patent Number: 5,597,216
[45] Date of Patent: Jan. 28, 1997

[54] MULTI-MEDIA STORAGE DRAWER ASSEMBLY

[76] Inventors: Frank Real; Francisco Real, both of 9950 Marconi Dr., Otay Mesa, Calif. 92173

[21] Appl. No.: 554,292

[22] Filed: Nov. 6, 1995

[51] Int. Cl.⁶ .................................................. A47B 81/06
[52] U.S. Cl. .................. 312/9.54; 312/351; 312/9.55; 211/40; 206/307.1
[58] Field of Search ...................... 312/9.45, 9.53, 312/9.54, 9.55, 9.56, 9.58; 211/40; 206/558, 563, 564, 307.1, 387.14

[56] References Cited

U.S. PATENT DOCUMENTS

| | | |
|---|---|---|
| 3,288,543 | 11/1966 | Sugerman . |
| 4,231,473 | 11/1980 | Aprahamian ........................ 211/40 |
| 4,411,481 | 10/1983 | Berkman . |
| 4,440,458 | 4/1984 | Berkman ........................... 312/9.54 |
| 4,607,894 | 8/1986 | Ackeret . |
| 4,629,067 | 12/1986 | Pavlik et al. ...................... 211/40 |
| 4,705,169 | 11/1987 | Mastronardo ..................... 312/9.54 |
| 4,782,949 | 11/1988 | Berkman ........................... 312/9.54 |
| 4,884,685 | 10/1989 | Ackeret . |
| 4,932,522 | 6/1990 | Micovich . |
| 5,005,708 | 4/1991 | Posso .................................. 312/9.58 |
| 5,127,716 | 7/1992 | Caspers et al. . |
| 5,358,321 | 10/1994 | Leonardi . |
| 5,383,722 | 1/1995 | Chen . |
| 5,399,006 | 3/1995 | Murazumi ......................... 312/9.53 |

*Primary Examiner*—Peter M. Cuomo
*Assistant Examiner*—Gerard A. Anderson
*Attorney, Agent, or Firm*—Charles C. Logan, II

[57] ABSTRACT

A multi-media storage drawer assembly that may be mounted in an entertainment cabinet, a combination coffee table and cabinet, a combination end table and cabinet, etc. The drawer has a plurality of multi-media storage cells and each storage cell can removably receive either a CD, an audio cassette, or a VHS cassette. The storage cells extend from the front wall of the drawer to its rear wall in a column formation. The drawer may have multiple side by side columns of multi-media storage cells. The drawer is integrally formed from plastic material and it has horizontal rails extending from the outer surfaces of its left and right side walls. A roller wheel is mounted adjacent the rear end of the respective side walls. Plastic molded tracks are mounted inside the cabinets and they have roller wheels that functionally engage the bottom surface of the rails extending from the opposite lateral sides of the drawer.

11 Claims, 3 Drawing Sheets

MULTI-MEDIA STORAGE DRAWER ASSEMBLY

BACKGROUND OF THE INVENTION

The invention relates to a drawer and more specifically to a drawer that would be mounted in furniture such as an entertainment center, a combination coffee table and cabinet, a combination corner table and cabinet and other types of furniture. The drawer is designed to receive CD's, audio cassettes, and VHS tapes.

Numerous storage devices for CD's, audio cassettes and video cassettes are known but none of them provide individual storage cells that are capable of receiving all three of these medias.

The Sugerman U.S. Pat. No. 3,288,543 discloses a storage rack for storing phonograph records in which vertical receiving trays are arranged in side-by-side relationship in a storage cabinet between top guide grooves and bottom channels. The vertical trays are supported on rollers for pulling the tray outward from and pushing the vertical trays back into the rack.

The Berkman U.S. Pat. No. 4,411,481 discloses a holder for audio/video cassettes in the form of a slidable drawer having a plurality of parallel storage compartments or bins for receiving and holding the cassettes in upright positions between opposing pairs of upstanding resilient fingers.

The Ackeret U.S. Pat. No. 4,607,894 discloses a storage system for disc-shaped records which includes a plurality of disc holders slidably mounted one above the other and deployable in a staggered stepwise fashion out of the housing. The holders have dished profiles which support the discs only at their edge regions.

The Berkman U.S. Pat. No. 4,782,949 discloses a storage module having a plurality of parallel storage compartments with upper and lower support surfaces for supporting magnetic tape cassettes of different sizes.

The Ackeret U.S. Pat. No. 4,884,685 discloses a device for storing flat recording media having a housing and a sliding member that is guided in the housing along rails.

The Milovich U.S. Pat. No. 4,932,522 discloses a CD storage device with a plurality of vertically spaced tray members being slidably mounted in the device and having structure for securing a CD container thereon.

The Caspers et al U.S. Pat. No. 5,127,716 discloses a compact disc player in which CD's are stored in a magazine housing one above the other in a stack. The magazine housing may be removed for loading the CD's.

The Chen U.S. Pat. No. 5,383,722 discloses a CD-ROM storage cabinet having a plurality of horizontal racks designed to slide from the cabinet between vertical walls. Each rack has pairs of aligned and fore and aft spaced partition plates defining parallel compartments for receiving the CD-ROMs upright therein. Each compartment has a bottom ridge upon which each CD-ROM rests and they can be rocked fore and aft relative to the compartment.

The Leonardi U.S. Pat. No. 5,358,321 discloses a modular multi-media cabinet that has an extractable drawer with removable partition members that can divide the drawer longitudinally to store and organize different combinations of media material.

The Murazumi U.S. Pat. No. 5,399,006 discloses a storage case having a housing and a plurality of shelf units for holding and storing cassettes. The shelf units are slidable drawers.

It is an object of the invention to provide a novel multi-media storage drawer that can removably receive either a CD, an audio cassette, or a VHS video cassette in each of its individual storage cells.

It is also an object of the invention to provide a novel multi-media storage drawer that has structure for allowing the CD's, audio cassettes, and VHS video cassettes to be rocked fore and aft relative to the storage cell during a search of the various multi-media members.

It is another object of the invention to provide a novel multi-media storage drawer that has integral rails extending laterally from its respective left and right side walls.

It is an additional object of the invention to provide a novel multi-media storage drawer that has roller wheels mounted directly on its lateral side walls adjacent their rear end.

It is a further object of the invention to provide a multi-media storage drawer that is made of plastic material formed into an integral unit.

SUMMARY OF THE INVENTION

The novel multi-media storage drawer assembly has a drawer divided into multiple storage cells. These storage cells are arranged in columns and the drawer may have a single column or multiple columns across its width. The drawer is preferably integrally molded from plastic material. Integrally formed horizontal rails extend laterally from the respective left and right side walls of the drawer. The drawers are supported by roller wheels beneath the rails. A roller wheel is also mounted on the respective left and right side walls adjacent their rear ends. These roller wheels each travel in a track that is mounted on the side walls of a cabinet. The tracks are also preferably formed of plastic material.

Each of the individual storage cells has laterally spaced upper concave flanges, middle concave flanges, and lower concave flanges for respectively removably receiving CD cases, VHS cases, and audio cassette cases. The concave top surface of the respective flanges allow the respective multi-media cases to be flipped fore and aft when looking through the drawer. The respective concave flanges are laterally spaced from each other a width less than the width of the respective cases.

The respective upper concave flanges, the middle concave flanges, and the lower concave flanges are arranged in columns and towers are formed between them. These towers have structure that limits the degree to which the various cases can be flipped forwardly and rearwardly and also provide distinct flat surfaces upon which they may rest in either their fore or aft position.

DESCRIPTION OF THE DRAWINGS

FIG. 8 is an enlarged cross sectional view illustrating the manner in which CD's and audio cassettes are stored in the storage cells;

DESCRIPTION OF THE PREFERRED EMBODIMENT

Figure 1:
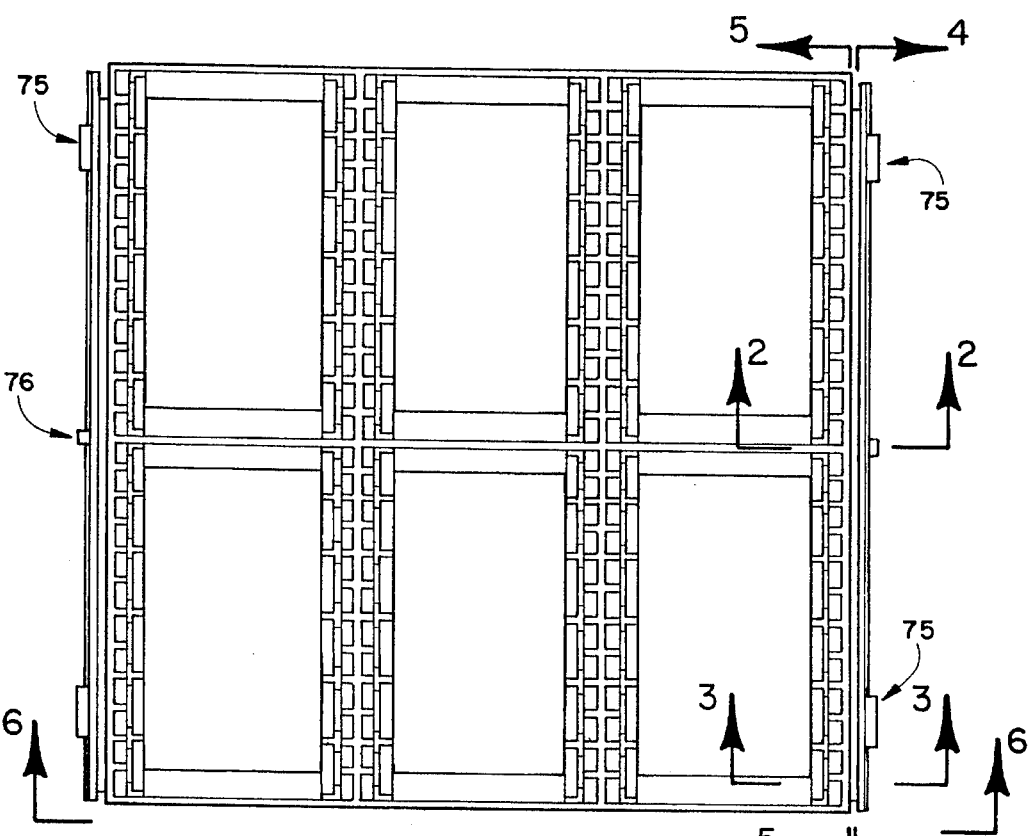
FIG. 1 is top plan view of a multi-media storage drawer having three columns of storage cells.
Figure 2:
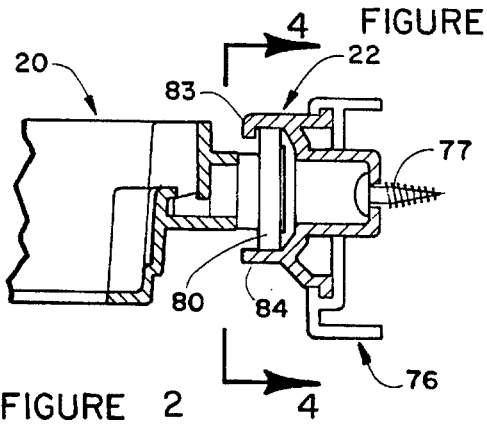
FIG. 2 is a cross sectional view taken along lines 2—2 of FIG. 1.
Figure 3:
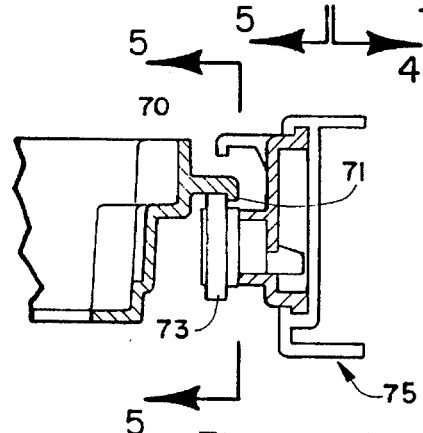
FIG. 3 is a cross sectional view taken along lines 3—3 of FIG. 1.
Figure 4:
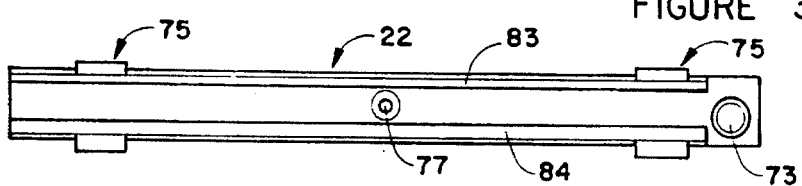
FIG. 4 is a side elevation view of one of the tracks taken along lines 4—4 of FIG. 2.
Figure 5:
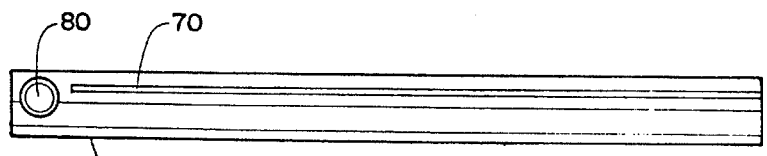
FIG. 5 is a side elevation view of the multi-media storage drawer taken along lines 5—5 of FIG. 3.
Figure 6:
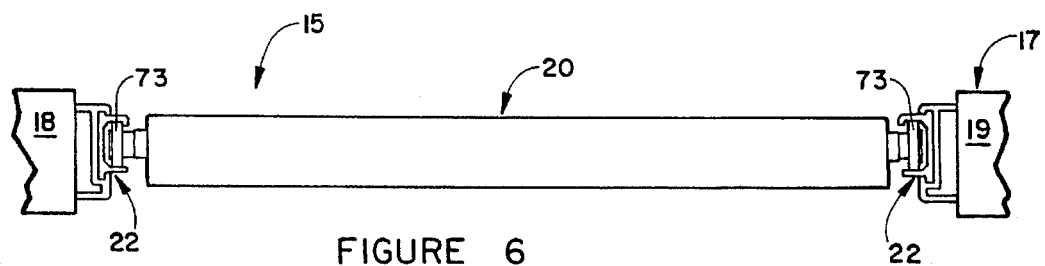
FIG. 6 is a front elevation view of the multi-media storage drawer assembly mounted in a cabinet.
Figure 7:
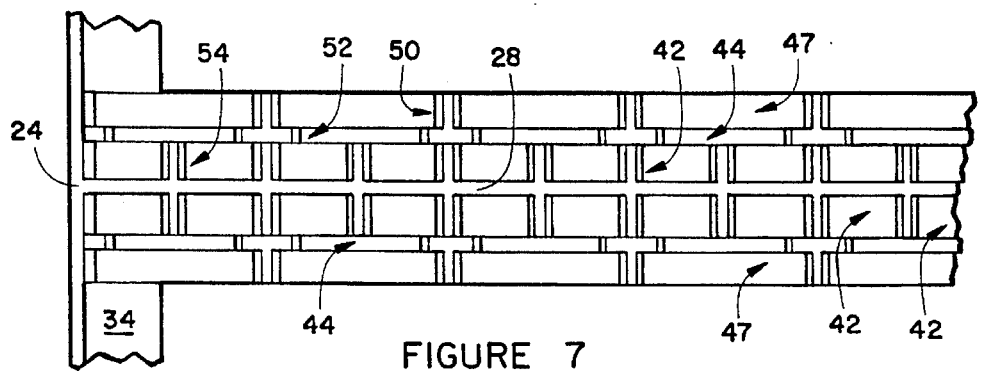
FIG. 7 is an enlarged partial top plan view of the multi-media storage drawer.

The novel multi-media storage drawer assembly is generally designated numeral 15 and will now be described by referring to FIGS. 1–11 of the drawings. The multi-media storage drawer assembly is mounted in a cabinet 17 (see FIG. 6) having laterally spaced side walls 18 and 19. Assembly 15 has as its basic components, a drawer 20 and two laterally spaced rails 22. The brackets for mounting the rails 22 are best illustrated in FIGS. 2 and 3 and will be discussed later.

Referring to FIGS. to 1–3 and 7–10, the structure of the multi-media storage drawer 20 will now be described. Drawer 20 has a rear wall 24, a front wall 25, and laterally spaced left and right side walls 26 and 27. An intermediate cross member 29 has its opposite ends connected to the respective side walls 26 and 27. Intermediate cross member 29 has a front flange 31 and a rear flange 32 adjacent its bottom edge. Rear wall 24 has a flange 34 and front wall 25 has a bottom flange 35 adjacent their bottom edges.

The storage space of drawer 20 is comprised of a plurality of storage cells 40 that each have the capability of removably receiving either a CD case, an audio cassette case or a VHF video cassette case. Storage cells 40 are arranged in columns extending from front wall 25 to rear wall 24. In the embodiment illustrated in FIG. 1, there are three parallel columns of storage cells 40.

Figure 10:
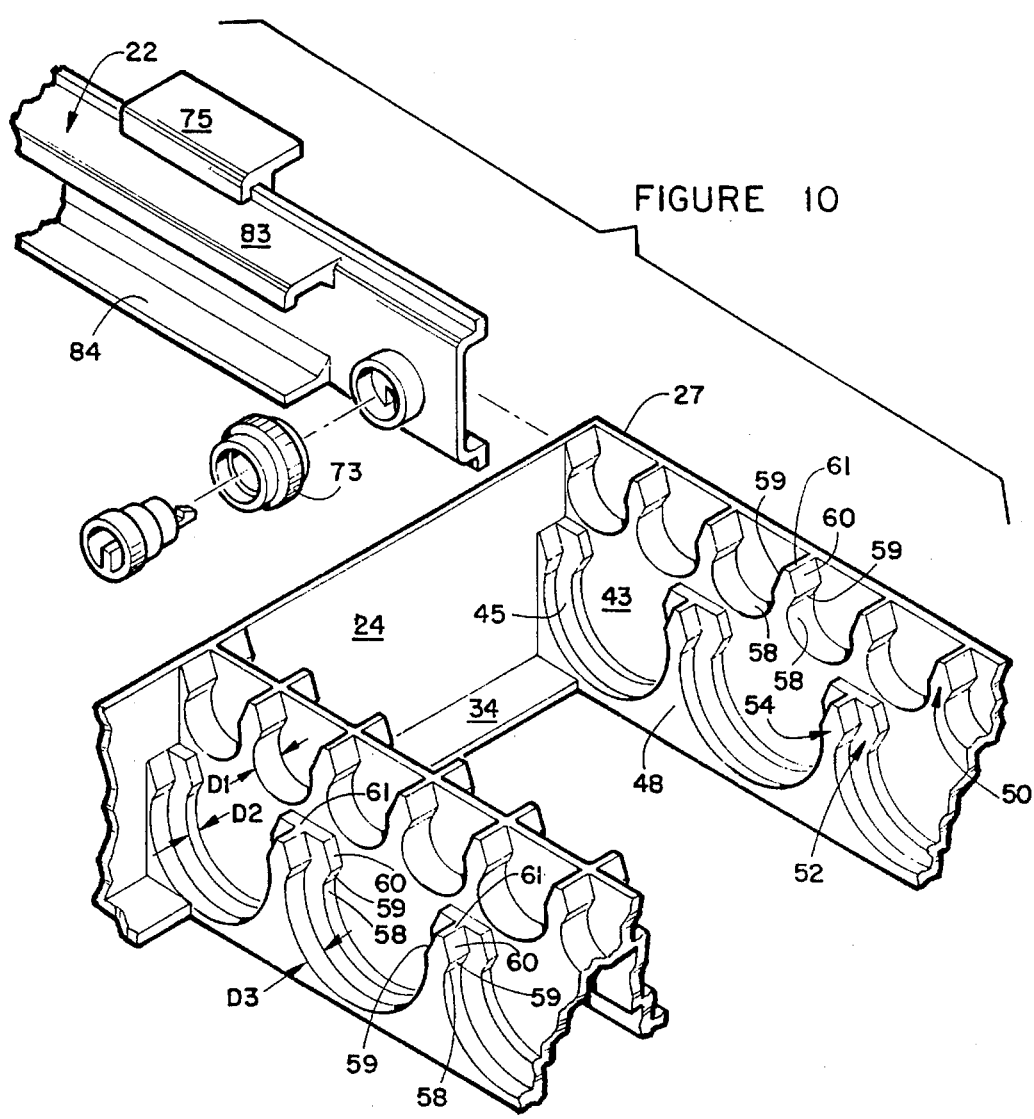
FIG. 10 is an exploded perspective view illustrating the multi-media storage drawer and the manner in which it is mounted in the track members.
Figure 11:
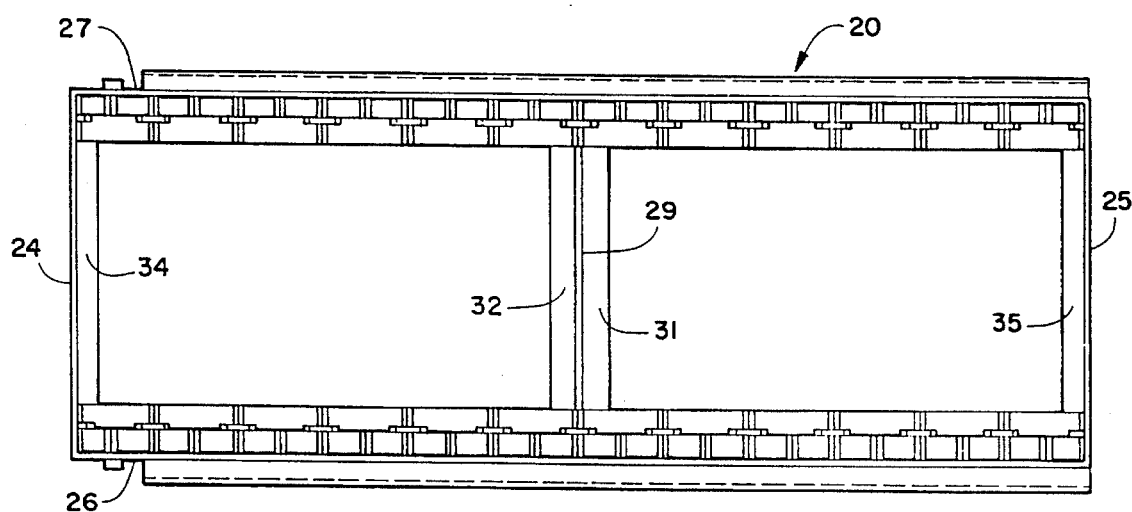
FIG. 11 is a top plan view of a multi-media storage drawer having a single column of storage cells.

The specific structure of storage cells 40 can be best understood by referring to FIG. 10. Each storage cell 40 has a longitudinally extending side wall 26 or 27 or one of the side walls would be an intermediate longitudinal wall 28. Upper flanges 42 extend inwardly a predetermined distance D1 from the respective left side, right side or intermediate side walls. Upper flanges 42 have a concave upper surface and said upper surfaces are spaced apart a predetermined width W1 so they can receive a CD in a standard case. A first upright wall 43 extends downwardly from each of said upper flanges 42. A middle flange 44 extends inwardly a predetermined distance D2 from the respective left and right first upright walls 43. Middle flange 45 has a concave upper surface and the upper surfaces are spaced apart a predetermined width W2 so they can removably receive a VHS tape in its standard case. Upright wall 45 extends downwardly from each of the middle flanges 45. A lower flange 47 extends inwardly a predetermined distance D3 from the respective second upright walls 45. Lower flanges 47 have a concave upper surface and these upper surfaces are spaced apart a predetermined distance W3 so they can removably receive an audio cassette tape in its standard case.

A tower 50 is formed between the adjacent concave upper surfaces of the respective upper flanges 42 of the column of multi-media storage cells 40. A tower 52 is formed between the adjacent concave upper surfaces of the respective middle flanges 44 of the column of multi-media storage cells 40. A tower 54 is formed between the adjacent concave surfaces of the respective lower flanges 47 of the column of multi-media storage cells. The concave upper surfaces of the respective flanges 42 and 44 and 47 have respective radius R1, R2 and R2.

Each of the towers 50, 52 and 54 have a pair of intersection lines 58, a pair of lower planar walls 59, a pair of upper planar walls 60 and a top wall 61.

Figure 8:
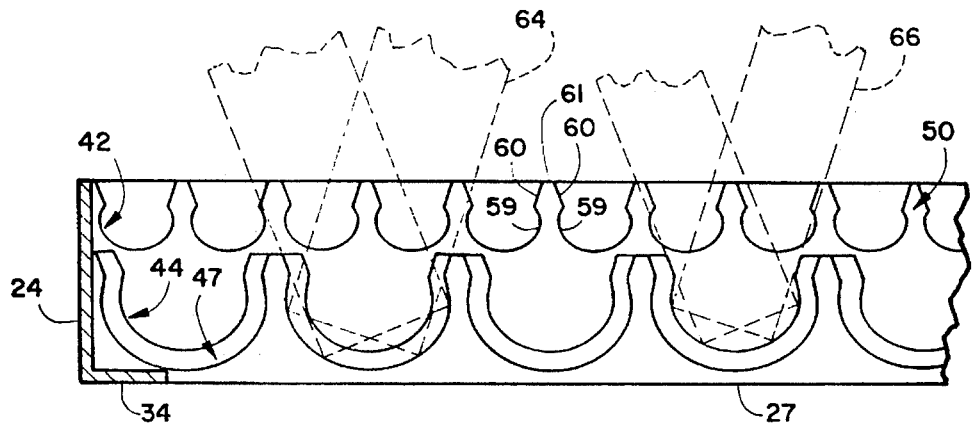
FIG. 8 is an enlarged cross sectional view showing the manner in which the VHS and audio cassettes in the respective storage cells.
Figure 9:
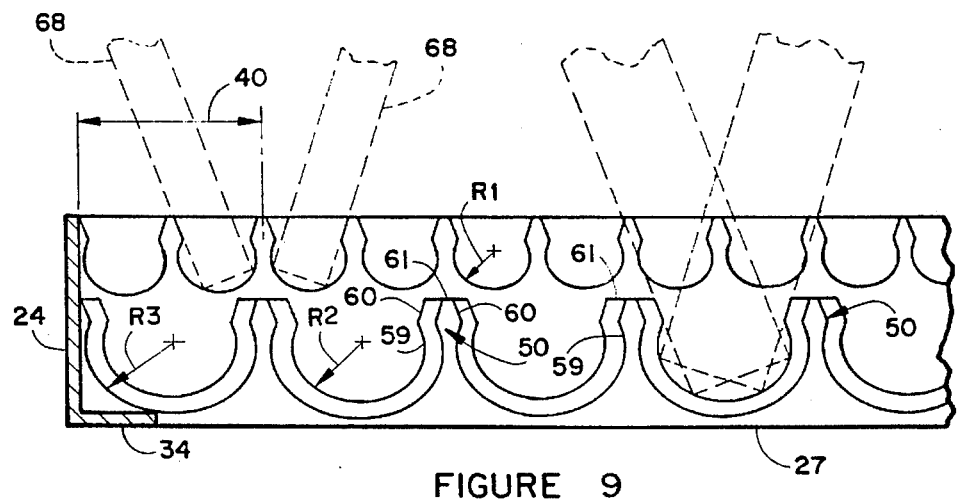

In FIGS. 8 and 9, VHS cases 64, audio cassettes cases 66 and CD cases 68 are shown in dotted lines in their flipped forward position and flipped rearward position. At each of these extreme positions the respective cases lie on the upper planar walls 60 and they prevent further forward or aft rotation of the respective cases.

Horizontal rails 70 extend laterally from the respective side walls 26 and 27 and they extend substantially the entire length of these walls. At least one of these rails 70 has a downwardly extending lip 71 that restricts lateral travel of drawer 20 on roller wheels 73. A pair of longitudinally extending tracks 22 are mounted on the respective side walls 17 and 18 of the cabinet by brackets 75 and 76 and secured thereto by screws 77. Roller wheels 80 are mounted on side walls 26 and 27 adjacent their rear ends. Roller wheels 80 travel between upper flange 83 and lower flange 84 of the longitudinally extending tracks 22.

What is claimed is:

1. A multi-media storage drawer assembly comprising:

a drawer having a front wall, a rear wall, a left side wall and a right side wall;

a column of multi-media storage cells extending from said front wall to said rear wall;

substantially all of said storage cells having an upper flange extending inwardly a predetermined distance D1 from said respective left and right side walls, said upper flanges having a concave upper surface and said upper surfaces being spaced apart a predetermined width W1 so that they can removably receive a CD in its standard case; a first upright wall extends downwardly from each of said upper flanges;

substantially all of said storage cells having a middle flange extending inwardly a predetermined distance D2 from said respective left and right first upright walls, said middle flanges having a concave upper surface and said upper surfaces being spaced apart a predetermined width W2 so that they can removably receive a VHS tape in its standard case; a second upright wall extends downwardly from each of said middle flanges; and substantially all of said storage cells having a lower flange extending inwardly a predetermined distance D3 from said respective second upright walls, said lower flanges having a concave upper surface and said upper surfaces being spaced apart a predetermined width W3 so they can removably receive an audio cassette in its standard case.

2. A multi-media storage drawer assembly as recited in claim 1 wherein said drawer is configured in the form of an open frame having a front wall, a rear wall, a left side wall and a right side wall.

3. A multi-media storage drawer assembly as recited in claim 1 wherein said drawer is integrally formed of plastic material.

4. A multi-media storage drawer assembly as recited in claim 1 wherein a tower is formed between the adjacent concave upper surfaces of said respective upper flanges of said column of multi-media storage cells.

5. A multi-media storage drawer assembly as recited in claim 1 wherein a tower is formed between the adjacent concave upper surfaces of said respective middle flanges of said column of multi-media storage cells.

6. A multi-media storage drawer assembly as recited in claim 1 wherein a tower is formed between the adjacent concave upper surfaces of said respective lower flanges of said column of multi-media storage cells.

7. A multi-media storage drawer assembly as recited in claim 1 further comprising a roller wheel mounted on the outer surface of the left and right side walls of said drawer adjacent their rear ends to provide a structure for supporting said drawer when said drawer is pulled out and pushed into a cabinet.

8. A multi-media storage drawer assembly as recited in claim 1 wherein a substantially horizontal rail extends outwardly from the left and right side walls of said drawer and said horizontal rails extend at least 50 percent of the length of said side walls and provide a structure for supporting said drawer on roller wheels when said drawer is pulled out of and pushed into a cabinet.

9. A multi-media storage drawer assembly as recited in claim 7 further comprising a left track and a right track each having a front end and a rear end; a roller wheel is mounted adjacent the front end of each of said track.

10. A multi-media storage drawer assembly as recited in claim 9 wherein said tracks and drawer are mounted in a cabinet.

11. A multi-media storage drawer assembly as recited in claim 1 wherein said drawer has a plurality of side by side columns of multi-media storage cells.

* * * * *